Aug. 30, 1966  P. J. UDELL  3,269,545
STRAINER
Filed May 21, 1963

INVENTOR
PHILIP J. UDELL
BY
Owen, Wickersham Erickson
ATTORNEYS 3,269,545
STRAINER
Philip J. Udell, Castro Valley, Calif., assignor to Dell-Carr-Wing Corporation of America, Castro Valley, Calif., a corporation of California
Filed May 21, 1963, Ser. No. 281,936
1 Claim. (Cl. 210—469)

This invention relates to an improved strainer for use with pots and pans, especially with those having a circular upper edge with an outwardly turned lip thereon.

In my U.S. Patent 2,398,978 I described a strainer for pots and pans, and the present invention is a considerable improvement thereon. Like the strainer of my previous patent, it replaces colanders, which are large, bulky, very seldom in a handy place, and are generally hard to wash and to keep clean, and it also replaces the practice of using the lid of the container as a strainer.

However, the strainer of the present invention solves several problems which were not solved by the previous device nor by other prior art. One of these problems was that the previous strainer tended to slide vertically off the pot, the force of the spring not being enough to hold it in place, and the weight of the liquid and solids against the strainer aggravated this tendency to slide off. The present invention has solved this problem and provides an adjustable straining device which will not slide off the pot or pan and which during use can be left untouched.

Another difficulty with prior art strainers, including the one of my earlier patent, was that they were difficult to lift off immediately after they had been used for pouring off some hot liquid, largely because the user had to touch hot metal in order to remove them. He therefore had to hold them by an insulating pot holder. In the present invention this problem is solved by providing special non-metallic-insulated finger grips which can safely be grasped with the bare hand.

Another difficulty with the strainer of my earlier patent and with other prior art was that in the central portion of the strainer the perforations of the two sheets did not align except at a few chance intervals; so the liquid could flow only at and near the edges. The present invention provided a novel slot-type perforation which enables pouring through the center of the strainer in all its positions, whether or not there is overlapping of the two sections.

Another important feature of the invention is that as the parts slide to open for engagement of the pan or for adjustment to different sizes, a straight pull is provided by an in-line action of the spring and the guide means.

Still other objects and advantages of the invention will become apparent after study of the following description of a preferred embodiment.

Figure 1:
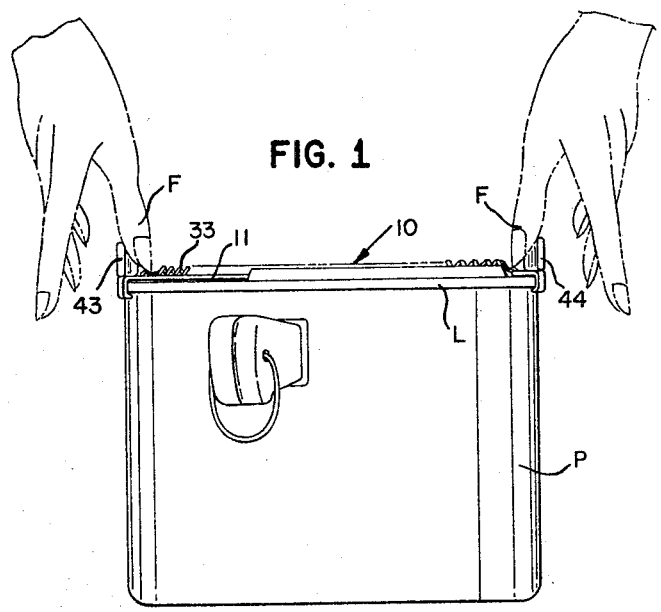
FIG. 1 is a view in elevation showing a pot on which a strainer embodying the principles of the present invention is being installed.
Figures 2, 3:
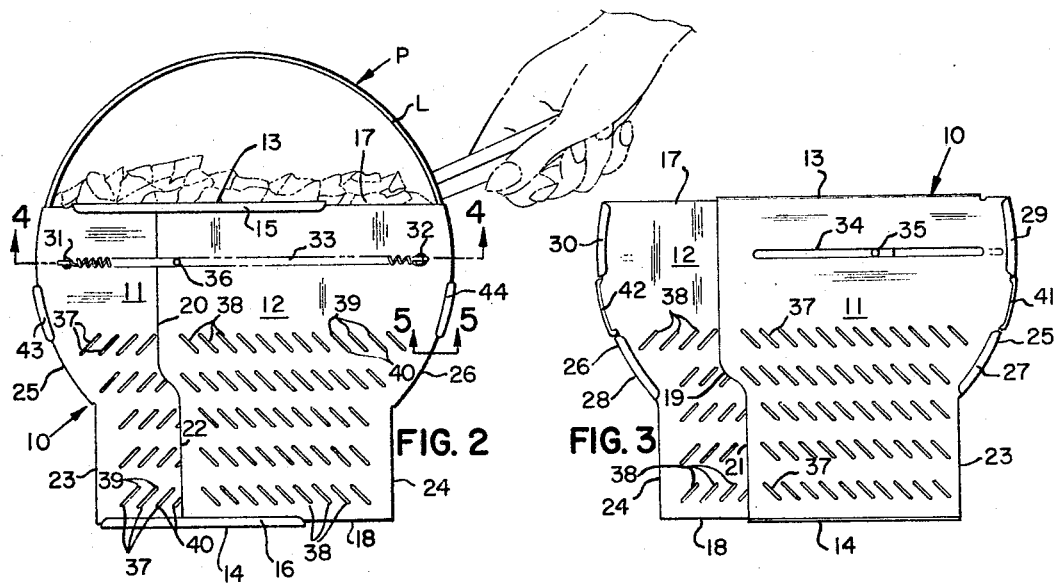
FIG. 2 is a plan view of the strainer as applied to the pot of FIG. 1.
FIG. 3 is a bottom plan view of the strainer alone.
Figure 4:
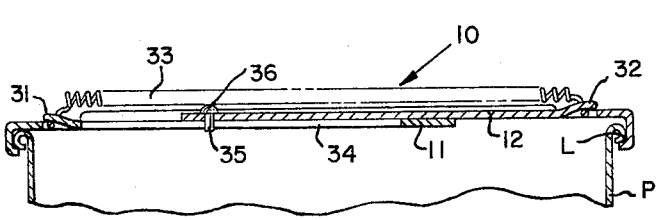
FIG. 4 is a view in section taken along the line 4—4 in FIG. 2.
Figure 5:
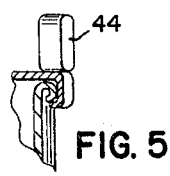
FIG. 5 is a view in section taken along the line 5—5 in FIG. 2.

The improved strainer 10 of this invention comprises a pair of sheet metal plates 11 and 12, preferably of aluminum or stainless steel or other non-corrosive material. The lower plate 11, as shown in FIGS. 2 and 3, has parallel rear and forward straight edges 13 and 14, each with a folded-over portion 15, 16 providing continuous channels along the major portion thereof. The upper plate 12 is provided with rear and forward parallel straight edges 17 and 18 which engage in the channels of the folded over portions 15 and 16; so that the two plates can be slid relatively to each other for enlarging or reducing the overlap and thereby respectively reducing or enlarging the effective area of the strainer 10.

The side edges of the upper and lower sheets are substantially symmetrical with each other, the inner edge 19 of the lower plate 11 and the inner side edge 20 of the upper plate 12 are substantially straight, although the forward half 21, 22 of each is preferably stepped in order to leave the rear area wider and the forward area narrower. Each outer edge has a forward straight or vertical portion 23, 24 like the forward portion 21, 22 of its opposite edge, and an arcuate rear portion 25, 26. Each arcuate portion 25, 26 is provided with two spaced-apart flanges 27, 29 and 28, 30, each bent downwardly and then inwardly to engage the lip L of a pot or pan P when the strainer 10 is installed, the two flanges on each side being spaced apart from each other. The forward flange (as seen in FIGS. 2 and 3) lies below the diametral line 4—4 of the circle of the arcuate edges 25, 26, and the rear flange lies principally above that line. In other words, most of the two rear flanges 29, 30 lie on one side of the center of the pot P when the strainer 10 is installed on the pot, and all the two forward flanges 27, 28 then lie on the other side of the center of the pot P.

Each sheet 11, 12 has a lug 31, 32 which may be formed by punching through and bending out a portion of the sheet 11, 12. An extension spring 33, preferably a helical spring, is anchored to each of the two lugs 31, 32 and thereby urges the two sheets 11, 12 toward their most overlapping position, where the edges 19 and 20 approach the lugs 32 and 31 of the other sheet. The lugs 31, 32, and the spring lie along the diametral line 4—4 of the strainer 10 and of the pot or pan P on which the strainer is being used. In other words, the axial line of the spring, if extended, would intersect the edges 25, 26 perpendicularly. As noted, a small portion of each rear flange 29, 30 lies to the rear of this diametral line 4—4, while the major portion of each lies forward of it. Thus, when the strainer 10 is installed on to pan P, and the pan P is tipped (FIG. 2), the tendency of the strainer 10 to slide down and to fall off the pan P is prevented since the upper portions of the rear flanges 29, 30 cannot move down any further once they come into engagement with the lip L of the pot P. Also, the strainer 10 cannot move in the other direction either, because of the forward flanges 27 and 28, even if the pot P were inverted and, if desired, the strainer 10 can be left in place after straining and the solid material poured off the opposite end of the pot P.

Along the same diametral line 4—4 as the spring 33 and parallel to it, a closed slot 34 is provided in the sheet 11, and a suitable stud 35 on the upper sheet 12 engages the slot. The stud 35 may be provided by punching a hole through the sheet 12 and inserting a rivet through the hole, with the head 36 of the rivet beneath the spring 33, so that the spring 33 will hold the rivet in place and the stud 35 side of the rivet need not even be upset. This stud 35 serves as a guide and is an additional device for preventing out-of-line movement between the two sheets 11 and 12. Being directly in line with the spring 33, there is no tendency for rotation around the stud 35.

The two plates 11 and 12 are perforated in an unusual manner. Each of them has a series of rows of 45°-angle slots 37, 38, the rows being spaced apart about the same distance as the height of each row, with the reat ends 39 of each slot 37, 38 of the same row being substantially in line with the forward end 40 of the succeeding slot 37 or 38, on a line parallel to the edges 22, 23 and perpendicular to the rows. The slots 37, 38 on the two sheets 11, 12 are reversed to that they cross each other at substantially a 90° angle. This means that although the plates 11, 12 overlap for a considerable area in practially all positions, there is still a substantial area of perforation even through the overlapping portion in all positions, for there is always at least one crossing of each slot 37 of one sheet 11 with one slot 38 of the other sheet 12, and in most positions there are two crossings; so there are generally two through openings at each slot 37 or 38, and always at least one. Moreover, when the slots 37, 38 are moved beyond the overlapping position, the full length of each slot 37, 38 is exposed so that there is still more width available.

Between the two flanges 27, 29 and 28, 30 on each arcuate edge, a portion 41, 42 (FIG. 3) of the metal sheet 11, 12 is bent upwardly, and this portion is covered with a suitable insulating plastic 43, 44 of any type able to withstand the heat of boiling water. This provides a pair of heat-insulated finger grips 43, 44 which the cook can use in removing the hot strainer 10 from the pot P, as well as when installing the strainer 10 on the pot P. Thus, by simply placing a finger or thumb F of each hand in the concave portion of each grip 43, 44 and moving the hands apart, the strainer 10 is enlarged against the pressure of its spring 33, and the strainer 10 also can be lifted by the grips 43, 44 so that the cook never need touch the metal at all. This means that she does not have to use a pot holder in order to lift off this strainer.

In operation, the strainer 10 will fit a wide variety of pots P. For example, a typical strainer P will fit pots as small as 6½" diameter up to as large as 10¼" diameter, and of course it can be made to fit even a wider variety or there can be more than one size, for use with a wider variety of pots, but this generally covers all the pots that one has in the home kitchen. The strainer 10 is placed right side up and on top of the pot or pan P and spread apart by moving the plastic grips 43, 44 outwardly. Thus, the cook simply grasps the adjustable strainer 10 by the plastic grips 43, 44, slides the strainer 10 open so that the metal flanges 27, 29 and 28, 30 clear the lip L of the pot or pan P, rests the strainer 10 on top of the pot or pan P and then releases the tabs 43, 44 gently; the spring 33 then pulls the strainer flanges 27, 28, 29, 30 tight against the pot lip L.

Since the arcuate portions 25, 26 extend on both sides of the diametral line of the pot P, and since the spring 33 lies along the diameter, it is apparent that although there may not be full linear engagement along any of the flanges 27, 28, 29, 30, there will be at least one engagement on one side of the diameter and one on the other side, on each side of the pot or pan, and this is enough to hold the strainer 10 in position and to prevent it from sliding and falling off during use, because the rear flanges 29, 30 are above the center line 4—4 of the sauce pan or pot and the resilient force of the spring 33 is exerted along that center line, being held there partly by the forward flanges 27, 28. Thus, the device adheres to the lip L and does not slide off.

For use, the user simply tilts the pot or pan P and strains the liquid through the holes 37, 38 of the strainer 10. When straining has been completed and the pot set down, the plastic finger grips 43, 44 are again used to spread the adjustable strainer 10 and to hold it while lifting it up off the pot or pan. The strainer 10 is very easy to clean by expanding it to its full width and washing out any remaining food particles from the slots with running tap water or warm water, or by submerging it into a dishpan or sink full of warm water. It does not have the screen work of colanders which is so hard to clean.

The strainer being substantially flat and very compact is easily stored in a drawer and takes a very small amount of space compared with ordinary colanders.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:

A strainer for use as with pots and pans having a circular upper edge with an outwardly turned lip thereon, said strainer comprising a pair of superimposed overlapping metal sheets, each of which has parallel straight forward and rear edges and two side edges, one side edge of each having an arcuate portion and lying on the opposite side from the arcuate edge of the other said sheet, the forward and rear edges of one said sheet each having a continuous, folded marginal portion, with the forward and rear edges of the other said sheet fitting slidably therein, an extension spring secured between two lugs, one on each said sheet, on a line parallel to said forward and rear edges and radial with respect to both said arcuate edges, so that when said strainer is installed on the pot said spring lies along the diametral line thereof to extent a force tending to urge said sheets to their maximum overlapping, a closed slot on one said sheet in line with said spring and stud means on the other said sheet engaging said slot, said spring overlying said slot and being somewhat longer, a pair of flanges along each said arcuate edge bent down and flanged inwardly for engagement of a said pot lip, one said flange being entirely on one side of the diametral line of said spring, the other intersecting said line but mostly on the other side, an upwardly bent finger grip between the flanges of each said pair of flanges, each said grip having a heat insulating coating thereon, and a series of 45°-angle slots on each said sheet, those on one sheet lying in the opposite direction from those in the other sheet, said slots lying in a plurality of rows parallel to said forward and rear edges and all forward of said spring, the successive slots of each line having their rear end terminating approximately in alignment with the forward end of the succeeding slot.

References Cited by the Examiner

UNITED STATES PATENTS

| | | | |
|---|---|---|---|
| 590,902 | 9/1897 | Nearing | 210—469 |
| 1,058,146 | 4/1913 | Burdin | 210—469 |
| 1,781,995 | 3/1930 | Alexander | 210—469 |
| 2,398,978 | 4/1944 | Udell | 210—469 |
| 2,552,806 | 5/1951 | Nelson | 16—116 |
| 2,590,395 | 3/1952 | Fry | 16—118 |
| 2,808,938 | 10/1957 | Glover | 210—469 |

REUBEN FRIEDMAN, *Primary Examiner.*

SAM ZAHARNA, *Examiner.*

C. M. DITLOW, *Assistant Examiner.*